Jan. 14, 1936.                R. T. ROYE                 2,027,653
                           WASH PIPE PACKING
                         Filed March 28, 1935

INVENTOR
R. T. ROYE
BY Jesse R. Stone
   Lister B. Clark
ATTORNEYS

Patented Jan. 14, 1936

2,027,653

UNITED STATES PATENT OFFICE 2,027,653

WASH PIPE PACKING

Richard T. Roye, Houston, Tex., assignor to Gray Tool Company, a corporation

Application March 28, 1935, Serial No. 13,468

4 Claims. (Cl. 285—9)

The invention relates to packings for glands, stuffing boxes, etc., where a sealed joint must be maintained between two relatively movable members. It is particularly directed to an improvement in the arrangement and use of lip, cup or U type packings, and has been illustrated in this application as applied to the "wash-pipe" packing of a hydraulic rotary swivel.

It is an object of the invention to provide a means for cleansing and lubricating the wearing face of a multiple lip type packing.

It is also an object of the invention to provide a means for flushing foreign material out of the packing recess.

It is a further object of the invention to provide a means for introducing fresh lubricant into a multiple lip-type packing between two of the lips so that it is confined against outward escape and may be forced along between the cups and wall of the recess.

It is still another object of the invention to provide a packing assembly for use on the wash pipe of hydraulic rotary swivels which may be cleansed periodically by the high pressure injection of lubricant at a point beneath the outermost lip of the packing.

Still another object is to provide a novel means of introducing and directing lubricants in a multiple U or lip packing.

A further object is to provide a means of periodically recovering the usefulness of the packing rings adjacent the pressure source to extend the ultimate life of the packing.

Another object is to lubricate the wearing face of a packing assembly, but not the stationary face so that the packing tends to maintain its original position.

These and other objects of the invention will be apparent to one skilled in the art when the following description is read in connection with the accompanying drawing, wherein.

Figures 1, 2:
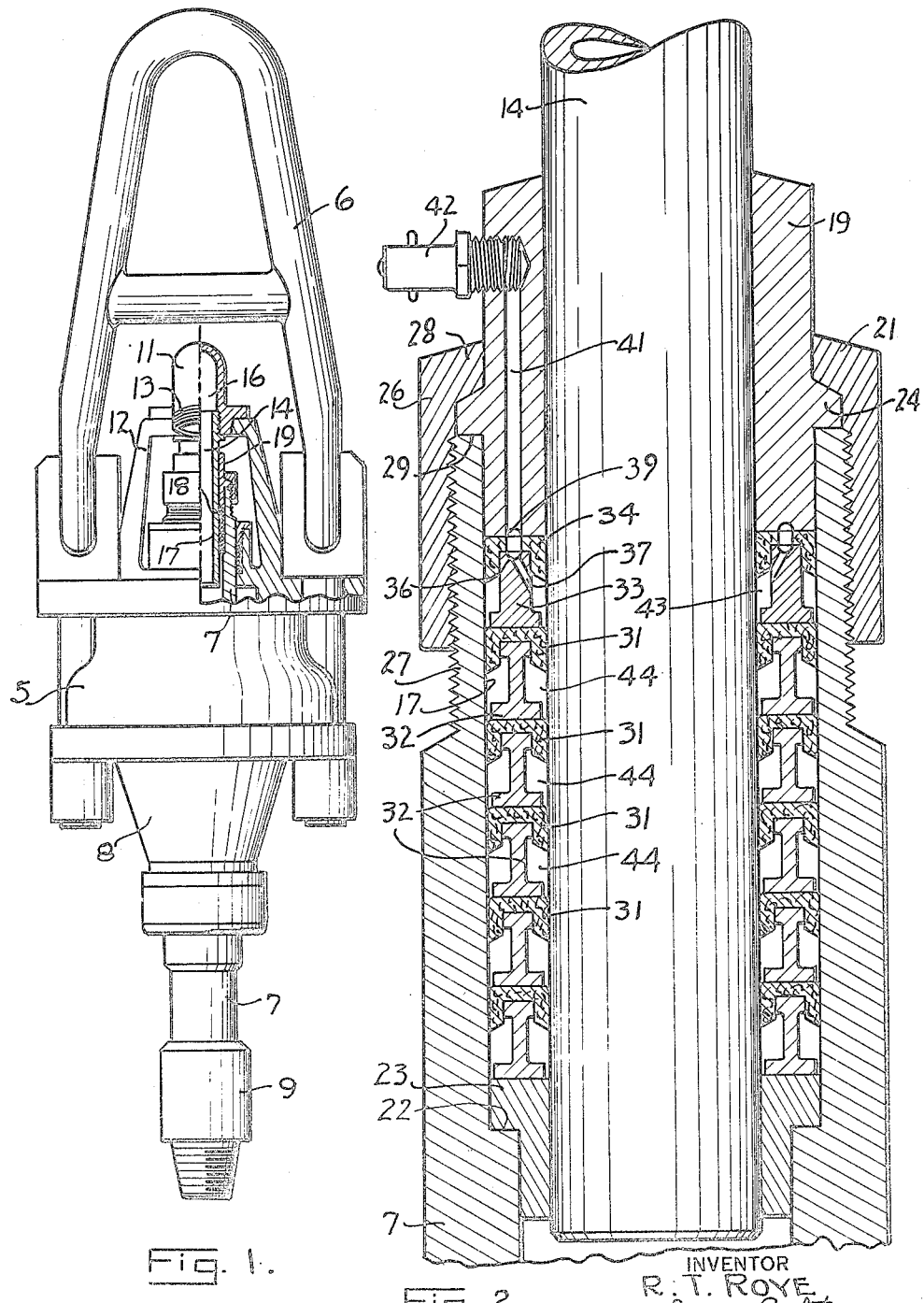
Fig. 1 is a side view of a hydraulic rotary swivel, certain parts being broken away to show the location of the packing gland which is the subject of the invention.
Fig. 2 is a vertical sectional view of the wash pipe packing gland or stuffing box as seen in Fig. 1, constructed in accordance with the invention.

In the rotary method of well drilling the hollow rotatable drill stem is connected to and supported by a rotary swivel, which includes a suitable thrust bearing to carry the suspended load. In addition, the swivel serves as a fluid connection between the slush pumps and the rotating drill stem, and this invention is directed to the packing gland for this particular fluid connection between a stationary and a rotating member.

The swivel 5 of Fig. 1 is provided with a suitable bail 6 by which the swivel and attached load may be supported. The swivel stem 7 extends vertically through the swivel body 8 and is rotatably mounted therein. The swivel stem is provided at its lower end with the coupling member 9 to which the drill stem, etc., may be attached.

The goose neck 11, at the upper end of the swivel, is mounted on the bracket 12 and is threaded at 13 for connection to a suitable hose clamp. The wash pipe 14 is secured to the goose neck 13 and forms a continuation of the fluid passage 16 therethrough. The wash pipe 14 telescopes the hollow swivel stem 7 and between the two there is formed the packing recess 17 adapted to receive a suitable packing 18, which is in turn held in place by the gland 19 and clamping ring 21.

The arrangement of this packing recess 17 and associated parts may be seen in detail in Fig. 2. The packing recess is here shown as being formed with a shoulder or seat 22 therein, on which the junk ring 23 is placed. The upper end of the packing recess is closed by the packing gland 19, which has a peripheral flange 24 thereon. A clamping ring 26 is threaded to engage the threads 27 formed on the swivel and has a rim 28 which is arranged to contact the flange 24 and force the gland into the packing recess or prevent the pressure from displacing the gland. The ring 26 may be screwed down to compress the packing or it may clamp the flange 24 against the end 29 of the swivel stem.

The swivel stem ordinarily rotates at speeds under 250 R. P. M., but the pressure may be several thousand pounds per square inch and the fluid handled which is the drilling fluid or slush, frequently contains gritty and abrasive materials which cause rapid wear and early failure of the wash pipe packing.

Various types of compression packings have been employed, but the present invention contemplates the use of a multiple cup, lip, or U packing and the provision of a novel means of flushing or cleaning and lubricating the packing at intervals.

In Fig. 2 there is shown a plurality of U-type packing rings 31 which may be of any suitable material such as rubber, leather, etc. Between these rings are the spacers 32 which may be of the required shape to properly contact and support the cups above and below. In the present structure the stem 7 rotates about the wash pipe 14, and the junk ring and gland move with the stem 7. Therefore the packing assembly should and normally does rotate with the stem. It will be seen that the lips of the packing face the applied pressure which comes from below.

The first U-packing ring exposed to the pressures takes the full pressure load until it is damaged or distorted, at which time it ceases to function and the next one takes the full load. A lip packing ring in a swivel may become inoperative due to the admission of foreign material under the lip, and if this foreign material is removed before any permanent damage is done the effectiveness of the seal is restored.

To remove such foreign matter is an object of this invention and this is accompanied by forcing clean lubricant along the wearing surface counter to the normally applied pressure. This lubricant moves past the lips of the packing and carries with it all foreign matter, at the same time renewing the grease supply.

In order that this flushing grease will pass principally along the wearing surface, it is injected at a point along this surface.

The spacer 33, beneath the outermost U-packing 34 is formed with an annular groove 36 in its upper face and ports or passages 37 connect this groove 36 with the space adjacent the wearing face and inwardly along the gland from the U-packing ring 34. A similar annular groove 39 is formed in the lower face of the gland 19, and is connected by the channel 41 to a suitable pressure connection 42 which may be of the "alemite" type or any other preferred. The U-packing ring 34 has perforations 43 therein connecting the opposite grooves 36 and 39. It will be seen that if high pressure grease is injected through the connection 42 it will move through the channel, grooves, ports, etc. into the space 43, and from there, since the cup 34 confines it against outward escape, it will move downwardly along the wash pipe 14 and into and through the successive spaces 44, under each of the packing lips and out around the junk ring 23.

Since the cleansing grease is originally directed along the wearing surface, very little if any, will get to the back side of the packing recess and the packing rings, not being lubricated, will tend to adhere to the back wall which is desired.

It is contemplated that this flushing operation will be performed at each of the general greasing periods, and at that time, there is no fluid pressure within the swivel stem and the pressure for flushing is easily attained.

What is claimed is:

1. In a hydraulic rotary swivel, a rotatable swivel stem supported therein, a stationary wash pipe extending downwardly into said swivel stem, a packing recess formed between said swivel stem and wash pipe and adapted to receive packing, a plurality of U-packings in said recess, said U-packings being downwardly faced and adapted to seal between said swivel stem and wash pipe, spacers between said U-packings, a gland to hold said packings in proper position, inwardly opening lubricant ports in the top spacer, and means to introduce lubricant through said ports whereby the lubricant will be confined against upward escape by the uppermost U-packing and may be forced downwardly between the U-packings and the wash pipe to flush the space therebetween.

2. In a hydraulic rotary swivel, a swivel stem, a stationary wash pipe telescoping said swivel stem, a packing recess formed between said stem and wash pipe, a gland to secure packing in said recess, a plurality of U-packing rings in said recess, said rings facing in the direction of the applied pressure, spacers between said rings, and lubricant ports in the outermost of said spacers, said ports being adapted to direct lubricant along the wearing face of the packing, said gland and the U-packing overlying said ported spacer having passages therein through which lubricant may be forced to said ports.

3. In a stuffing box having a packing recess, a gland, a plurality of U-packing rings therein, said rings facing the applied pressure, spacers between said rings, the outermost of said rings having perforations through the bottom thereof, annular grooves in the gland and spacers on opposite sides of said perforated cup, said gland having a channel through which lubricant may be forced, and a lubricant port to conduct the lubricant from the annular groove in said spacer to one side of the assembly of packing rings and spacers and interiorly of said perforated cup whereby the lubricant is confined against outward escape and may be forced along one side of the packing assembly counter to the applied pressure to expel foreign material.

4. A multiple U-packing assembly for sealing between relatively rotating members including a plurality of U-packing rings faced in the direction of the applied pressure, spacers between said U-packing rings, said packing rings and spacers being adapted to rotate with one of said members, a lubricant port formed in the uppermost spacer, and a lubricant passage through the top U-packing and terminating in said port whereby a lubricant may be forced into the packing recess at a point beneath the top U-packing and between the packing assembly and the rotating member with which it seals.

RICHARD T. ROYE.